E. Detwiler,
Spittoon,
№ 78,722. Patented June 9, 1868.

Witnesses:
J. B. Smith
Perry B. Smith

Inventor.
E. Detwiler

United States Patent Office.

E. DETWILER, OF MILWAUKEE, WISCONSIN.

Letters Patent No. 78,722, dated June 9, 1868.

---

IMPROVED SPITTOON.

---

*The Schedule referred to in these Letters Patent and making part of the same.*

---

TO ALL WHOM IT MAY CONCERN:

Be it known that I, E. DETWILER, of the city and county of Milwaukee, and State of Wisconsin, have invented a new and useful Improvement in Parlor-Spittoons; and I do hereby declare that the following is a full, clear, and exact description thereof, which will enable those skilled in the art to make and use the same, reference being had to the accompanying drawing, forming part of this specification, in which—

Figure 1:
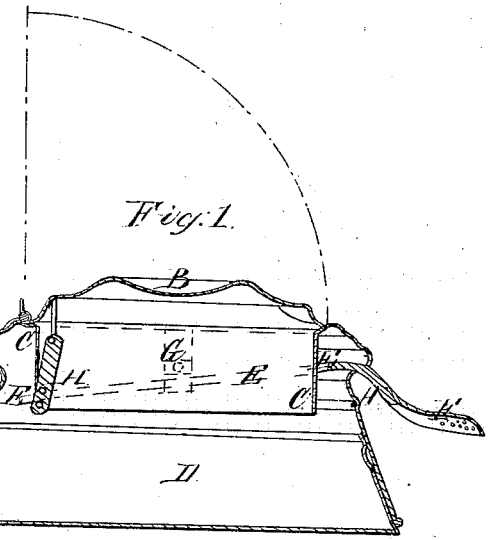

Figure 1 is a vertical sectional view, and

Figure 2:
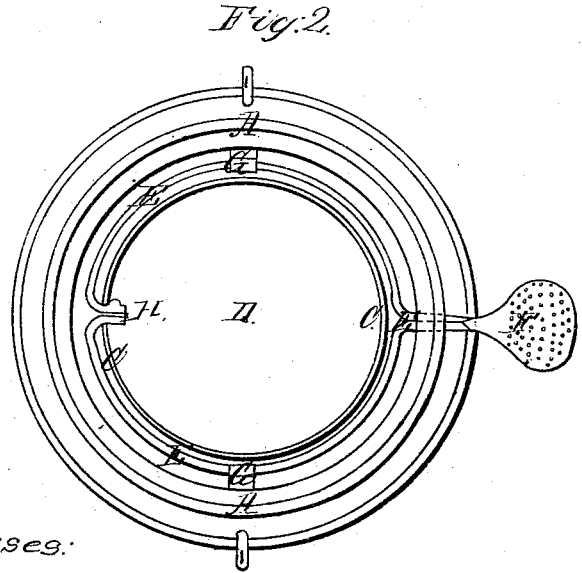

Figure 2 a top view with the cover and top rim removed.

Similar letters of reference in each of the figures indicate corresponding parts.

The object of my invention is to produce a spittoon which will be neat and handy for use in parlors and other rooms.

A is the outside shell, open at the bottom. B is the cover, hinged to the top of shell A. C is a curb, hanging down inside from the top of shell A. D is the inside receptacle, to hold whatever is thrown into the spittoon. It is made tapering, open at the top, which is smaller than the bottom, and a recess is turned or pressed from the outside near the top. The outside shell A slips down over this receptacle, D, and spring-catches, on each side of shell A, fit into this recess in D, and hold it in place.

E is an annular lever, inside of shell A, and between it and curb C. F, handle and treadle to lever E. G G, hanging fulcra for lever E, secured to the inside of shell A. H, a rod, connecting lever E to cover B by a link on the under side of the cover, near where it is hinged to shell A. I I, spring-catches, on the inside of shell A, to hold receptacle D in place. These catches have their upper ends secured to shell A, and are turned out at the bottom, and pass out through holes in the shell, and their outer ends turned in loops, so that they can be taken hold of and pulled out, releasing the receptacle D, so that it can be taken out and cleaned.

Operation.

The spittoon being together, as shown, (fig. 1,) step the toe on treadle F, bearing it down; this raises the back side of lever E, and, by means of connecting-rod H, cover B is raised, as shown in red dotted lines, fig. 1. When the pressure is taken off treadle F, cover B falls back to its place and closes the spittoon.

What I claim as my invention, and desire to secure by Letters Patent, is—

A spittoon, constructed with outside shell A, with cover B, with inside curb C, with receptacle D, lever E, with treadle F, and connecting-rod H, secured together with springs I I, substantially as and for the purpose specified.

E. DETWILER.

Witnesses:
   J. B. SMITH,
   PEVEY B. SMITH.